United States Patent Office 3,360,508
Patented Dec. 26, 1967

3,360,508
MONOAZO DYESTUFFS OF THE INDAZOLE SERIES
Robert Frederic Michel Sureau, Enghien-les-Bains, Gilbert Victor Henri Krémer, Ermont, and Victor Marie Dupré, Louvres, France, assignors to Etablissements Kuhlmann, Paris, France
No Drawing. Filed Jan. 26, 1965, Ser. No. 428,198
Claims priority, application France, Nov. 29, 1960, 845,310
6 Claims. (Cl. 260—163)

The present application which is a continuation-in-part application of application Ser. No. 154,821 filed Nov. 24, 1961 (now abandoned) concerns improvements in and relating to new dyestuffs of the indazole series.

In our pending U.S. patent application No. 140,260 filed on Sept. 25, 1961, now U.S. Patent 3,340,272, granted Sept. 5, 1967, we have described, amongst other new products the hydrazones of the general formula:

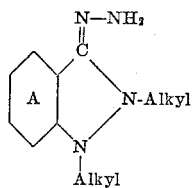
(I)

in which A may possibly be substituted by halogen atoms and non-solubilizing groups such as alkyl, alkoxy, nitro, alkylsulphonyl, sulphonamido or cyano groups, while the "Alkyl" groups in positions 1 and 2 may be the same or different. As fully disclosed in the aforesaid U.S. Patent 3,340,272, hydrazones of the general Formula I can be prepared by reaction of hydrazine hydrate with 1,2-dialkyl-3-halo-indazolium salts. The 1,2-dialkyl-3-halo-indazolium salts can themselves be prepared by alkylation of 3-halo-N-alkyl-indazoles, using for example, alkylating agents such as alkyl halides, dialkyl sulphates, or p-toluene alkyl sulfonates. The 3-halo-N-alkyl-indazoles can, in turn, be prepared by halogenation of N-alkyl-indazoles or by alkylation of 3-halo-indazoles.

It has now been found that valuable dyestuffs are obtained by condensing a hydrazone of Formula I in the presence of an oxidising agents with a coupling compound of the Formula H–B–Y (II), in which B represents an aromatic or heterocyclic radical and Y represents an amino group or a hydroxyl group of phenolic or enolic nature, present in the ortho or para positions with respect to the hydrogen atom H. The radical B may possibly be substituted in its remaining positions. The amino group Y may be simple or substituted. The dyestuffs resulting from the condensation may be represented by the following general formulae:

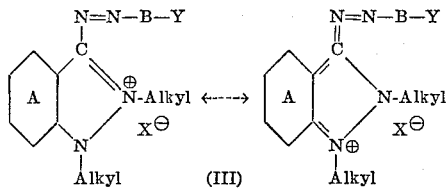
(III)

in which X represents a monovalent anion and the other symbols have the same significance as above. Among the new dyestuffs of Formulae III may be mentioned, for example, the compounds of the general formulae:

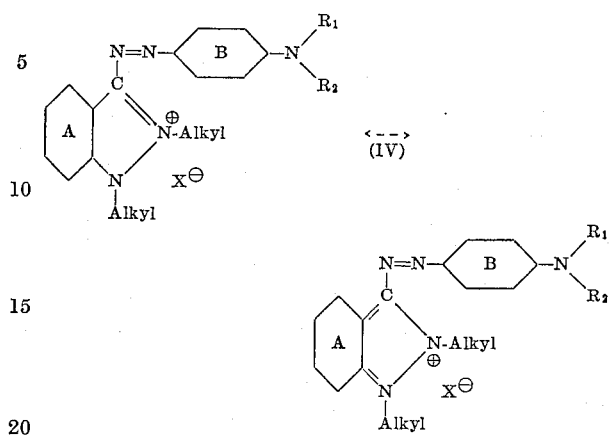
(IV)

in which the benzene nucleus A may be substituted as indicated above, the benzene nucleus B may be substituted for example by alkyl, alkoxy, amino, alkylamino, acylamino, alkoxycarbonylamino, or alkylsulphonylamino groups, $R_1$ and $R_2$ each represent hydrogen atoms or alkyl, hydroxyalkyl, cyano, alkyl, aryl or aralkyl groups and X represents a monovalent anion.

The oxidising coupling reaction is conveniently carried out at room temperature in aqueous medium. Certain organic solvents which are miscible with water such as acetic acid or dioxan may also be used, but as a rule alcohols must be avoided. In fact they favour the formation of blue and green dyestuffs of the tetra-aza-pentamethine cyanine series, which are described and claimed in U.S. Patent No. 3,173,905 filed on Oct. 17, 1961. Even in alcoholic medium, however, it is possible to find reaction conditions under which the dyestuffs of the present invention are formed in a considerable proportion. These conditions are generally a high concentration and an elevated temperature.

If the coupling is an amine then the coupling is preferably effected at a pH from 4 to 7 inclusive, the acidity being obtained, for example, by addition to the reaction medium of small quantities of an organic acid such as for example acetic acid. If the coupling compound is phenolic or enolic then the coupling is preferably effected at a pH from 7 to 9 inclusive, the alkalinity being obtained, for example, by addition of ammonia, or alkali metal acetates or carbonates to the reaction medium.

A wide variety of oxidising agent may be used such as for example hydrogen peroxide, organic per-acids e.g. peracetic acid, per-salts e.g. perborates, persulphates, permanganates, chromates or dichromates, hypochlorites or hypobromites, chlorites, ferricyanides, or peroxides, e.g. manganese or lead dioxide. It may be advantageous to catalyse the reaction by the addition of small quantities of reducing salts such as ferrous sulphate.

The dyestuffs formed generally precipitate in the crystalline state and their separation may be completed if necessary by the addition of for example sodium chloride and/or zinc chloride.

The dyestuffs of the general Formula III are found to be particularly interesting for the colouration of fibres based on polymers or copolymers of acrylonitrile. They provide a very varied range of shades extending from red to blue, while passing through all the intermediate shades of bordeaux, ruby and violet. With the dyestuffs of general Formula III one obtains uniform shades on polyacrylonitrile fibres without mottling, even in the absence of levelling agents. These shades are very fast, especially to dry heat and to light.

The invention includes a composition of matter comprising an anion and a cation in which the anion is polyacrylonitrile and the cation a compound of the formula:

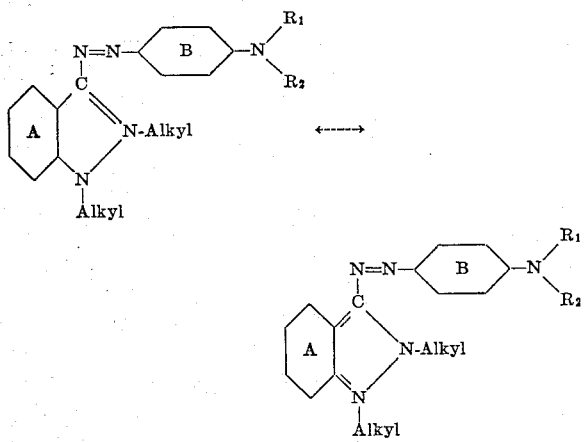

in which the benzene nucleus A is substituted by a member selected from the group consisting of hydrogen and chlorine atoms, the nitro and cyano groups and the benzene nucleus B is substituted by a member selected from the group consisting of the hydrogen atom, alkyl, alkoxy, amino, alkylamino, acetylamino, alkoxycarbonylamino and alkylsulphonylamino groups, the alkyl and alkoxy radicals of the aforesaid substituents of A and B having 1 to 2 carbon atoms inclusive and $R_1$ and $R_2$ each represents a member selected from the group consisting of the hydrogen atom, methyl, ethyl, hydroxyethyl, cyanoethyl and phenyl groups.

In the following examples, to which the invention is not limited, the parts are by weight unless the contrary is indicated.

Example 1

26 parts of 1,2-dimethyl-6-nitro-3-indazolone hydrazone hydrochloride are dissolved in 500 parts of water. A solution of 16 parts of 2,5-dimethoxyaniline in 20 parts of glacial acetic acid is added and a solution of 10 parts of sodium chloride in 100 parts of water is introduced with stirring over a period of half an hour. A deep violet partially precipitates. After 4 hours stirring, the mixture is heated to 60–70° C. and the precipitation is completed by addition of 150 parts of a saturated solution of sodium chloride. The product is allowed to cool, and the precipitate is filtered off, washed with 10% brine, drained and dried in an oven. 33 parts of a dyestuff are obtained which dissolves in water giving a violet solution.

A solution of 0.5 part of this dyestuff in 200 parts of water is prepared and to it are added 2 parts of acetic acid at 60 g. per litre and 0.5 part of a condensation product from castor oil and ethylene oxide. 100 parts of fibres based on acrylonitrile polymer are introduced at 50° C. the temperature of the bath is raised progressively to boiling point and this temperature is maintained for an hour and a half. A full-bodied violet shade is obtained, which has excellent general fastness, especially to light.

The 1,2-dimethyl-6-nitro-3-indazalone hydrazone hydrochloride is prepared as follows.

200 parts of 3-chloro-6-nitro-indazole are dissolved at 60–65° C. in 2500 parts of water and 120 parts by volume of caustic soda containing 400 g. per litre. This solution is agitated and 200 parts by volume of dimethyl sulphate and 120 parts by volume of caustic soda containing 400 g. per litre are introduced simultaneously in a period of half an hour. The mixture is maintained at 60–65° C. for 4 hours, left to cool, filtered and the yellow crystalline precipitate formed is washed. This precipitate is a mixture of the isomers -$N_1$- and $N_2$-methyl-3-chloro-6-nitro-indazoles. It is dried at 100° C. Weight obtained: 211 parts. Melting point: 133–35° C.

63 parts of this dry mixture are introduced into 75 parts of freshly distilled methyl sulphate. The mixture is progressively heated with agitation. The mass goes completely into solution towards 120° C., and it is maintained for some minutes at this temperature. The temperature then rises of itself to 140° C. owing to the substantial crystallisation observed. The temperature is maintained for a further 10 minutes at 130–135° C., the product is left to cool, 100 parts of ethyl alcohol are added and it is left overnight in the cold. The solid is filtered off, thoroughly drained, washed with alcohol and dried under vacuum. 94 parts of 1,2-dimethyl-3-chloro-6-nitro-indazolium-sulphomethylate are collected in the form of a white, slightly yellowish product which is very soluble in water.

68 parts of this compound are dissolved in 500 parts of water. The solution is introduced in a period of 45 minutes under the liquid in a stirred mixture of 60 parts of hydrazine hydrate and 400 parts of water at 0° C. The hydrazone precipitates at once in the form of fine beige-brown crystals. After 10 minutes agitation, 120 parts by volume of normal hydrochloric acid are gradually added, then 100 parts of salt. The acidification brings about complete solution. The addition of salt to the yellow solution obtained causes the crystallisation of the hydrochloride of the hydrazone as orange-yellow crystals. Weight of the dry product obtained: 42 parts. It is recrystallised from water for analysis:

Calculated for $C_9H_{12}ClN_5O_2$, percent: C, 41.95; N, 27.2; C, 113.7. Found, percent: C, 42.5; N, 27.8; C, 13.7. Ammonia is added to the hydrochloride solution, a precipitate of free hydrazone in the form of fine beige-brown crystals being formed. Melting point: 112–113° C.

By replacing the 3-chloro-6-nitro-indazole with 3-chloro-5-nitro-indazole in the above preparation, the corresponding 1,2-dimethyl-5-nitro-3-indazalone hydrazone hydrochloride is prepared.

Example 2

On replacing the 1,2-dimethyl-6-nitro-3-indazolone hydrazone in Example 1 by its 5-nitro-isomer, there is obtained under the same preparation conditions a dyestuff which dyes fibres based on acrylonitrile polymer a violet shade which is more bluish than the preceding one but which otherwise has similar properties.

A number of other analogous examples are grouped in the table below.

| Ex. | Hydrazone | Coupling compound | Shade on polymer or copolymer of acrylonitrile |
|---|---|---|---|
| 3 | 1,2-dimethyl-3-indazolone hydrazone. | 2-methyl-5-methoxy-aniline. | Bluish red. |
| 4 | ----do---- | 2-methyl-5-methoxy-N-ethylaniline. | Ruby red. |
| 5 | ----do---- | 2,5-dimethoxy-N-dimethylaniline. | Red violet. |
| 6 | ----do---- | 2-methyl-5-methoxy-N-dimethylaniline. | Do. |
| 7 | 6-nitro-1,2-dimethyl-3-indazolone hydrazone. | 2,5-dimethoxy-N-dimethylaniline. | Violet. |
| 8 | ----do---- | 2-methyl-5-methoxy-aniline. | Ruby. |
| 9 | ----do---- | 5-methyl-2-methoxy-aniline. | Red violet. |
| 10 | ----do---- | 5-methyl-2-methoxy-N-dimethylaniline. | Bluish violet. |
| 11 | ----do---- | 2-methyl-5-methoxy-N-dimethylaniline. | Violet bordeaux. |
| 12 | ----do---- | 3-methoxyaniline. | Bluish red. |
| 13 | ----do---- | N-dimethylaniline. | Violet. |
| 14 | ----do---- | 1-methyl-2,4-diaminobenzene. | Brown. |
| 15 | ----do---- | Meta-toluidine. | Bordeaux. |
| 16 | ----do---- | 2,5-dimethylaniline. | Do. |
| 17 | ----do---- | 2-methoxy-N-dimethylaniline. | Navy blue. |
| 18 | ----do---- | 2,5-dimethoxy-N-cyanoethylaniline. | Violet. |

| Ex. | Hydrazone | Coupling compound | Shade on polymer or copolymer of acrylonitrile |
|---|---|---|---|
| 19 | 6-nitro-1,2-dimethyl-3-indazolone hydrazone. | 3-methoxy-4-methyl-aniline. | Violet brown. |
| 20 | ___do___ | 3-acetylaminoaniline. | Ruby. |
| 21 | ___do___ | 5-acetylamino-2-methylaniline. | Do. |
| 22 | ___do___ | 3-acetylamino-2,6-dimethylaniline. | Do. |
| 23 | ___do___ | 3-acetylamino-6-methoxyaniline. | Blue violet. |
| 24 | ___do___ | 3-acetylamino-N-dimethylaniline. | Do. |
| 25 | ___do___ | 3-acetylamino-N-diethylaniline. | Do. |
| 26 | ___do___ | 3-methoxycarbonyl-amino-aniline. | Red. |
| 27 | ___do___ | 3-ethoxycarbonyl-amino-aniline. | Bluish red. |
| 28 | ___do___ | 3-acetylamin-N-cyanoethylaniline. | Bordeaux. |
| 29 | ___do___ | 3-ethoxycarbonyl-amino-N-cyano-ethylaniline. | Ruby. |
| 30 | ___do___ | α-naphthylamine. | Blue. |
| 31 | ___do___ | N-ethyl-α-naphthyl-amine. | Greenish blue. |
| 32 | ___do___ | 2-methyl-5-methoxy-aniline. | Bordeaux. |
| 33 | ___do___ | 2-methyl-5-methoxy-N-ethylaniline. | Violet. |
| 34 | ___do___ | 2,5-dimethoxy-N-dimethylaniline. | Blue violet. |
| 35 | ___do___ | 5-methyl-2-methoxy-N-dimethylaniline. | Blue. |
| 36 | ___do___ | 3-methoxy-aniline. | Bluish red. |
| 37 | ___do___ | 3-methoxy-N-dimethylaniline. | Violet. |
| 38 | ___do___ | 3-methoxy-diphenyl-amine. | Do. |
| 39 | ___do___ | m-Phenylenediamine. | Red brown. |
| 40 | ___do___ | N-dimethylaniline. | Royal blue. |
| 41 | ___do___ | N-diethylaniline. | Do. |
| 42 | ___do___ | N-diethyl-m-toluidine. | Do. |
| 43 | ___do___ | N-ethyl-N-hydroxy-ethylaniline. | Do. |
| 44 | ___do___ | N-methyl-N-hydroxy-ethylaniline. | Blue. |
| 45 | ___do___ | 2-methoxy-N-di-methylaniline. | Grey blue. |
| 46 | ___do___ | 2,5-dimethoxy-N-cyanoethylaniline. | Violet blue. |
| 47 | ___do___ | 3-methoxy-4-methyl-aniline. | Violet brown. |
| 48 | ___do___ | 3-acetylaminoaniline. | Red violet. |
| 49 | ___do___ | 5-acetylamino-2-methoxy-aniline. | Lavender blue. |
| 50 | ___do___ | 3-acetylamino-N-dimethylaniline. | Do. |
| 51 | ___do___ | 3-acetylamino-N-diethylaniline. | Royal blue. |
| 52 | ___do___ | 3-methoxycarbonyl-aminoaniline. | Ruby. |
| 53 | ___do___ | 3-ethoxycarbonyl-amino-aniline. | Do. |
| 54 | ___do___ | 3-ethoxycarbonyl-amino-N-cyano-ethylaniline. | Red violet. |
| 55 | ___do___ | 3-methylsulphonyl-amino-aniline. | Ruby. |
| 56 | ___do___ | N-methylsulphonyl-3-N-methylamino-aniline. | Red violet. |
| 57 | ___do___ | 3-acetylamino-N-cyanoethylaniline. | Violet. |
| 58 | ___do___ | α-Naphthylamine. | Greenish blue. |
| 59 | ___do___ | N-ethyl-α-naphthyl-amine. | Turquoise. |
| 60 | 6-chloro-1,2-dimethyl-3-indazolone hydrazone. | 2,5-dimethoxy-N-dimethylaniline. | Red violet. |
| 61 | 6-cyano-1,2-dimethyl-3-indazolone hydrazone. | ___do___ | Do. |
| 62 | 6-nitro-1-methyl-2-ethyl-3-indazolone hydrazone. | 3-acetylamino-aniline. | Ruby. |
| 63 | 6-nitro-1-ethyl-2-methyl-3-indazolone hydrazone. | ___do___ | Do. |
| 64 | 6-nitro-1,2-diethyl-3-indazolone hydrazone. | ___do___ | Do. |

*Example 65*

26 parts of 1,2-dimethyl-6-nitro-3-indazolone hydrazone hydrochloride are dissolved together with 18 parts of 1-phenyl-3-methyl-5-pyrazolone in 200 parts of water and 1000 parts of ethanol. 40 parts by volume of concentrated ammonia are added, then in half an hour a solution of 10 parts of sodium chlorite in 100 parts of water. At the end of two hours the mixture is taken gently to 40° C. over a period of two hours. It is left to cool, then 250 parts of water and 100 parts of a saturated solution of sodium chloride are added. A red precipitate is obtained in very good yield, which is filtered off, washed with water and dried at 100° C. This dyestuff of the following formula:

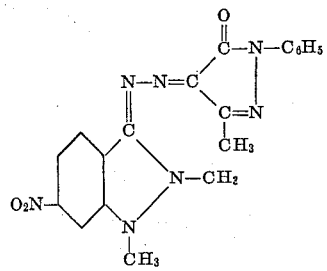

is insoluble in water and gives an orange solution in acetic acid.

*Example 66*

If one replaces the coupling compound used in Example 65 by 15 parts of β-naphthol, then under the same conditions starting from normal room temperature, a red-brown pigment is obtained of the formula:

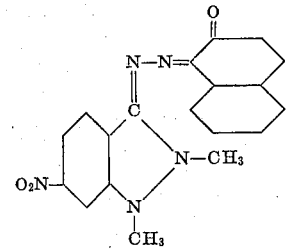

which, after recrystallisation from chlorobenzene, melts at 230–232° C.

What we claim is:
1. The dyestuffs of the formula:

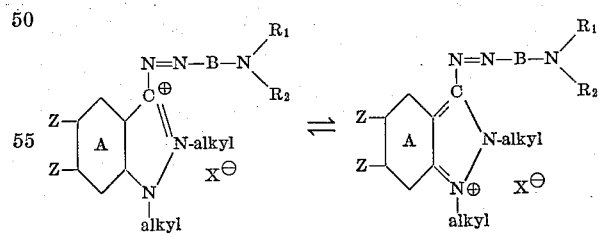

in which one Z attached to the benzene nucleus A is a nitro group and the other a hydrogen atom, each of the alkyl substituents is a member selected from the group consisting of methyl and ethyl groups, B represents a member selected from the group consisting of p.phenylene, methyl substituted p.phenylene, methoxy substituted p.phenylene, acetylamino substituted p-phenylene, methoxycarbonylamino substituted p-phenylene, ethoxycarbonylamino substituted p.phenylene, methylsulphonylamino substituted p.phenylene, and 1,4-naphthylene; $R_1$ and $R_2$ each represents a member selected from the group consisting of the hydrogen atom, the methyl, ethyl, hydroxyethyl, cyanoethyl and phenyl groups; and X represents a monovalent anion.

2. The dyestuff of formulae:

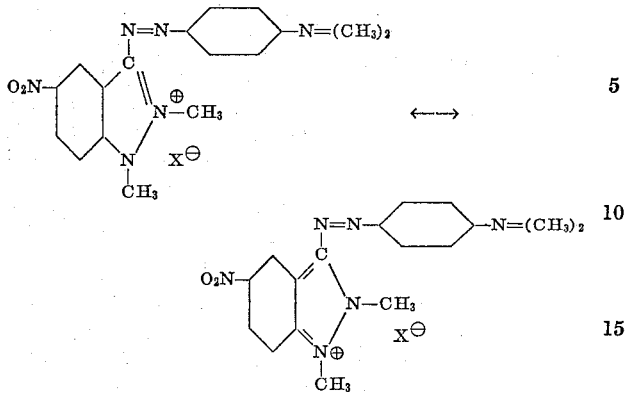

in which X represents a monovalent anion.

3. The dyestuff of formulae:

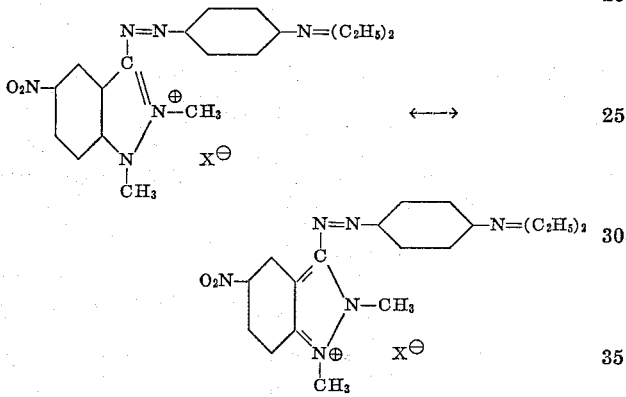

in which X represents a monovalent anion.

4. The dyestuff of formulae:

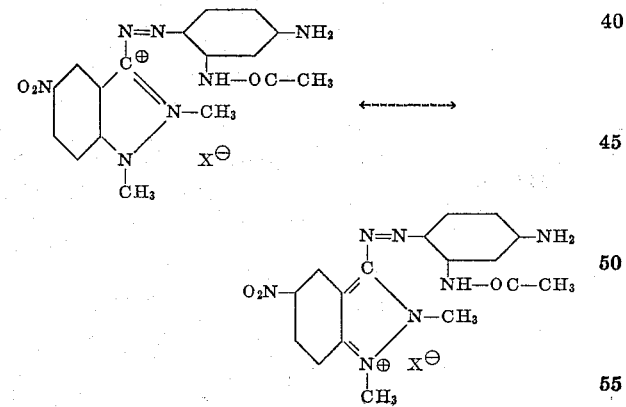

in which X represents a monovalent anion.

5. The dyestuff of formulae:

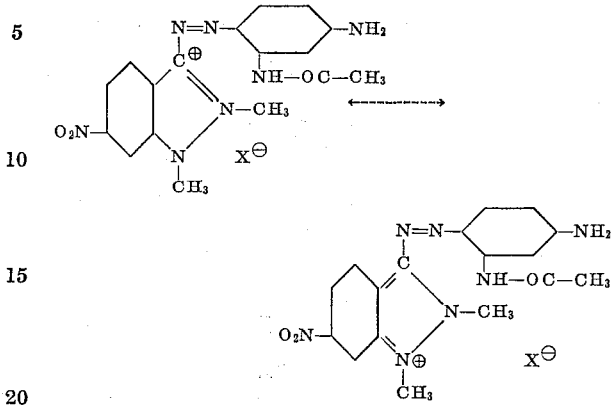

in which X represents a monovalent anion.

6. The dyestuff of formulae:

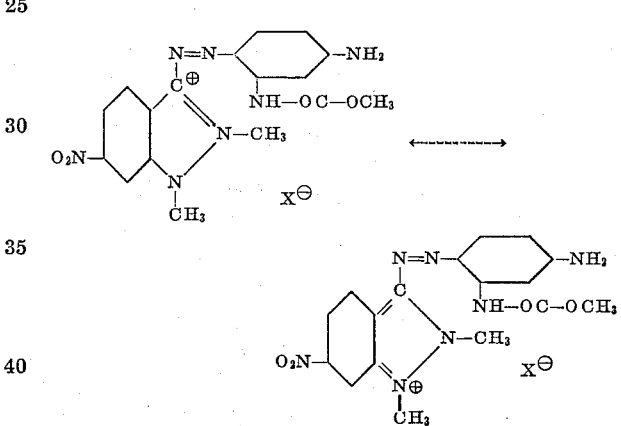

in which X represents a monovalent anion.

References Cited
UNITED STATES PATENTS
2,883,373    4/1959    Bossard et al. _____ 260—157
3,101,988    8/1963    Bossard et al. _____ 260—163

CHARLES B. PARKER, *Primary Examiner.*
JOSEPH P. BRUST, *Examiner.*
D. M. PAPUGA, *Assistant Examiner.*